UNITED STATES PATENT OFFICE.

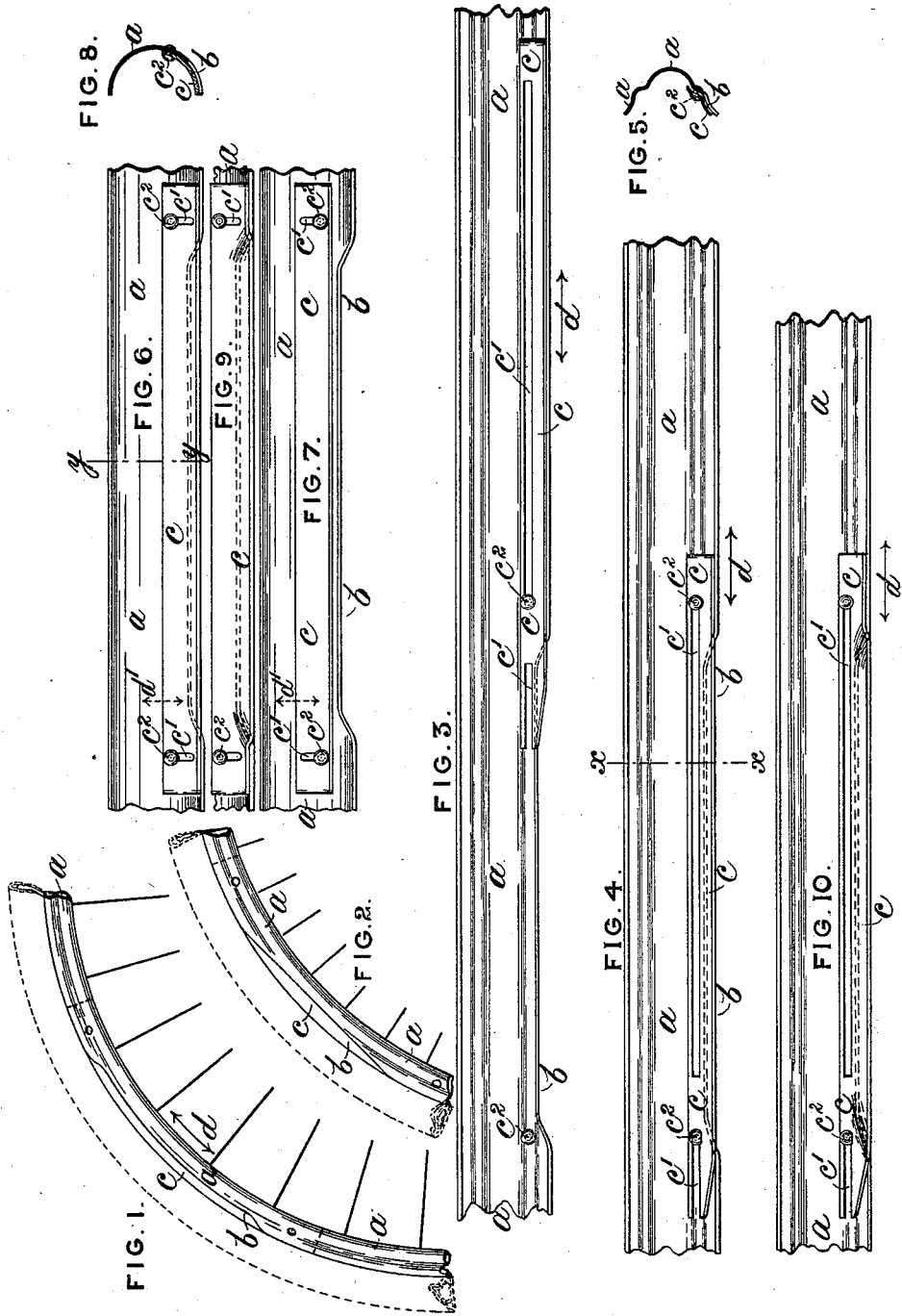

JOHN PEARSON, OF LEVENSHULME, ENGLAND, ASSIGNOR OF TWO-THIRDS TO JOHN BENNETT PRICE, OF CHORLTON-CUM-HARDY, AND EDWARD TURNER WHITELOW, OF MANCHESTER, ENGLAND.

RIM FOR PNEUMATIC-TIRED WHEELS.

SPECIFICATION forming part of Letters Patent No. 591,568, dated October 12, 1897.

Application filed March 24, 1897. Serial No. 629,007. (No model.)

*To all whom it may concern:*

Be it known that I, JOHN PEARSON, a subject of the Queen of Great Britain and Ireland, and a resident of 16 Broome Avenue, Levenshulme, county of Lancaster, England, have invented certain Improvements in the Rims or Fellies of Wheels for Carrying Pneumatic Tires, of which the following is a specification.

This invention relates to improvements in or applicable to the rims or fellies of wheels for carrying pneumatic tires, and has for its object to facilitate the insertion and the removal of the tire from the rim.

The said invention relates more particularly to rims which are provided with a gap and movable filling-piece for the purpose aforesaid; and it consists in the especial construction and combination of parts hereinafter particularly set forth and claimed.

The accompanying drawings, to which reference is hereinafter made, illustrate the invention in several forms.

Figure 1 is a side elevation of part of a felly having a cicumferential depression. Fig. 2 is a side elevation showing a tangential depression. Fig. 3 is a plan of the felly, showing the filling-piece slid back in a circumferential direction. Fig. 4 is a plan corresponding to Fig. 3, with the filling-piece closing the depression in the felly. Fig. 5 is a cross-section through $x\ x$ of Fig. 4. Figs. 6 and 7 are plans showing a filling-piece which slides across the plane of the wheel. Fig. 8 is a cross-section through $y\ y$ of Fig. 6. Figs. 9 and 10 illustrate the filling-piece dished or molded so that when in position its external surface is approximately level with that of the felly.

In all the figures $a$ is the felly or rim of the wheel. $b$ is the depression opening or gap in the side of the rim. $c$ is the overlapping filling-piece, guided by slots or grooves $c'$ and studs or pins $c^2$. The said slots are transverse with respect to the said filling-piece, and the said studs are headed to prevent the said filling-piece from being accidentally separated.

In the form shown in Figs. 1, 2, 3, 4, 5, and 10 the filling-piece $c$ is slid in a circumferential direction, as indicated by the double-headed arrows $d$.

The depression or opening $b$ may be circumferential, as shown in Fig. 1, or approximately tangential, as shown in Fig. 2.

In the forms shown in Figs. 6, 7, 8, and 9 the filling-piece $c$ is slid transversely to the plane of the wheel, as indicated by the dotted arrows $d'$.

Where it is desired that the external surface of the filling-piece $c$ shall be level or flush with that of the felly, that part of the filling-piece $c$ which comes opposite to the opening $b$ is dished, stamped, molded, or otherwise fashioned so as to project through and fill up the opening, as shown in Figs. 9 and 10. In this latter case the shanks of the pins or studs are made rather longer, so as to enable the filling-piece to be withdrawn inwardly from the opening before being slid back.

What I claim as my invention, and desire to secure by Letters Patent, is—

In combination with a wheel-rim adapted to receive a pneumatic tire and provided with a gap in its periphery, a sliding filling-piece adapted to close the said gap and provided with short transverse slots and headed studs extending out through the said slots substantially as set forth.

In testimony whereof I have signed my name to this specification in the presence of two subscribing witnesses.

JOHN PEARSON.

Witnesses:
   A. T. WHITELOW,
   JOHN HALL.